US006598358B1

(12) United States Patent
Schwertfeger et al.

(10) Patent No.: US 6,598,358 B1
(45) **Date of Patent: *Jul. 29, 2003**

(54) USE OF AEROGELS FOR DEADENING STRUCTURE-BORNE AND/OR IMPACT SOUNDS

(75) Inventors: Fritz Schwertfeger, Frankfurt (DE); Marc Schmidt, Frankfurt (DE); Dierk Frank, Hofheim (DE)

(73) Assignee: Cabot Corporation, Billerica, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,074

(22) PCT Filed: Jan. 22, 1998

(86) PCT No.: PCT/EP98/00328

§ 371 (c)(1),
(2), (4) Date: Sep. 23, 1999

(87) PCT Pub. No.: WO98/32708

PCT Pub. Date: Jul. 30, 1998

(30) Foreign Application Priority Data

Jan. 24, 1997 (DE) .......................................... 197 02 238

(51) Int. Cl.$^7$ .......................... E04B 1/62; C04B 14/06; B01J 13/00; G10K 11/162

(52) U.S. Cl. ......................... 52/145; 181/284; 181/290; 181/294; 181/295

(58) Field of Search ............................ 52/145; 181/284, 181/290, 294, 295

(56) References Cited

U.S. PATENT DOCUMENTS 5,304,415 A * 4/1994 Kurihara et al. ............ 428/328
5,306,555 A 4/1994 Ramamurthi et al. ....... 428/289

FOREIGN PATENT DOCUMENTS

EP 0340707 11/1989
WO WO 96/12683 5/1996

OTHER PUBLICATIONS

English language abstract of DE 3814968 published Nov. 16, 1989.

"Measurements in Building Acoustics", pp. 1–43, Brüel & Kjaer, Naerum, Denmark (Jan. 1988).

* cited by examiner

*Primary Examiner*—D. S. Nakarani
(74) *Attorney, Agent, or Firm*—Frommer Lawrence & Haug LLP

(57) ABSTRACT

Aerogel particles, in particular in the form of composite materials, are used to deaden structure-borne and/or impact sounds.

7 Claims, No Drawings

USE OF AEROGELS FOR DEADENING STRUCTURE-BORNE AND/OR IMPACT SOUNDS

RELATED APPLICATIONS

This application is filed pursuant to 35 USC §371 of international application No. PCT/EP98/00328, filed Jan. 22, 1998, which in turn claims priority to German application No. 197 02 238.3, filed Jan. 24, 1997.

BACKGROUND OF THE INVENTION

1. Field of the Invention

The present invention relates to the use of aerogels for deadening structure-borne and/or impact sounds.

2. Description of the Related Art

Understood by structure-borne sound within the context of the present document is sound propagating in solid substances; understood by impact sound is sound which arises e.g. during the inspection of covers or moving of chairs and which is emitted as structure-borne sound and partly also as airborne sound (company brochure of Rhinolith Damstoffe GmbH; Technical data: in 150 Bauphysik 6/96; W. Reichardt: "Grundlagen der technischen Akustik" [Fundamentals of technical acoustics], Akademische Verlagsgesellschaft, Leipzig, 1968).

Conventional materials which attenuate structure-borne and impact sound based on polystyrene, polyolefins and polyurethanes are produced with the use of propellants, such as FCKW's, $CO_2$ or pentane. The cell structure of the foam produced by propellants is responsible for the high impact and structure-borne sound-attenuating capacity. However, such propellants are harmful to the environment, since they slowly escape into the atmosphere.

Other attenuating substances for structure-borne and impact sounds based on mineral or glass-fiber wool can emit fibers and/or fiber fragments during their production, installation and dissembling, as well as during their use. This leads to a harmful effect on the environment and humans who handle these substances or are exposed thereto.

Aerogels, particularly those having porosities over 60% and densities below 0.6 $g/cm^3$ have an extremely low thermal conductivity. For this reason they are used as heat-insulating materials, such as described e.g. in EP-A-0 171 722. In addition, the velocity of sound in aerogels has a very low value for solids, which can be utilized for the production of airborne sound-deadening materials.

Aerogels, considered in the broad sense, i.e. in the sense of "gel with air as dispersing agent", are produced by drying a suitable gel. Falling under the designation "aerogel" within this meaning are aerogels in the narrower sense, xerogels and kryogels. Here, a dried gel is designated as aerogels in the narrow sense when the liquid of the gel has been extensively eliminated at temperatures above the critical temperature and starting from pressures above the critical pressure. On the other hand, if the liquid of the gel is eliminated under subcritical conditions, e.g. during the formation of a liquid-vapor boundary phase, then the resulting gel is often referred to also as a xerogel.

In using the term aerogel in the present application, aerogels are considered in the broad sense, i.e. in the sense of "gel with air as dispersing agent."

Different processes for the preparation of aerogels by supercritical or subcritical drying are disclosed e.g. in EP-A-0 396 076, WO 92/03378, WO 94/25149. WO 92/20623 and EP-A-0 658 513.

The aerogels obtained by supercritical drying are generally hydrophilic or have only a brief hydrophobicity, whereas aerogels dried under subcritical conditions, are permanently hydrophobic, due to their mode of production (in general, by silylation before drying).

Beyond this, aerogels may basically be classified into inorganic and organic aerogels, with inorganic aerogels known already since 1931 (S. S. Kistler, Nature 1931, 127, 741), whereas organic aerogels prepared from the most varied starting materials, e.g. from melamine formaldehyde, are known only since a few years (R. W. Pekala, J. Mater. Sci. 1989, 24, 3221).

Known in the art are aerogel-containing composite materials which, because of their low thermal conductivity, are used as thermal insulation materials. Such composite materials are disclosed, e.g., in EP-A-0 340 707, EP-A-0 667 370, WO 96/12683, WO 96/15997, WO 96/15998, DE-A-44 30 642 and DE-A-44 30 669.

Furthermore, DE-A 44 30 642, DE-A 44 30 669, WO 96/19607 and German patent application 195 33 564.3 disclose the airborne sound-deadening behavior of aerogel-containing composite materials.

It would be of great advantage to have a material available which, apart from good heat insulation properties, at the same time possesses good structure-borne and/or impact sound-deadening properties.

This applies particularly to insulation jobs in building construction. As an example, mention may be made of impact sound deadening in the floor region. Here, the use of such an insulating material would lead to a reduced insulation thickness and thus to a gain in room height. At constant room height this would reduce the building material requirement and the overall height of a multi-storied building. If, in addition, such an insulating material has a lower density than insulating constructions hitherto used, this fact would have positive effects on overall statics, since the building can, on the whole, be constructed to be lighter. If a system containing such an insulation material can be installed and processed independently of outside weathering and requires little or no drying or curing times, this leads to large savings of time and cost in the construction of the whole building.

Another sphere of application of such insulating materials is insulation between footings, such as e.g. machine bases or bases of buildings or building parts having separate foundations.

OBJECTS OF THE INVENTION

Hence, the object of the present invention was, on the one hand, to provide new materials suitable for the deadening of structure-borne and/or impact sound, which can be prepared in a simple manner and in any desired shape and whose size can be changed at the site where they are used, and, on the other hand to look for new aerogel applications.

SUMMARY OF THE INVENTION

This object is accomplished by the use of aerogel particles for deadening structure-borne or impact sound.

DETAILED DESCRIPTION OF THE INVENTION

In general, the aerogels used are those based on metal oxides which are suitable for the sol-gel technique (C. J. Brinker and G. W. Scherer: Sol-Gel Science 1990, Chapters 2 and 3), such as e.g. Si or Al compounds or those on the basis of organic substances suitable for the sol-gel techniques, such as melamine-formaldehyde condensates (U.S. Pat. No. 5,086,085) or resorcinol-formaldehyde condensates (U.S. Pat. No. 4,873,218). Mixtures of the above-mentioned materials may also be used. Used with preference are aerogels containing Si compounds, and $SiO_2$ aerogels in particular.

In a particularly preferred embodiment the aerogel particles have permanently hydrophobic surface groups. Suitable groups for permanent hydrophobization are e.g. silyl groups of general formula $—Si[R]_n$, where n=1, 2 or 3, and preferably trisubstituted silyl groups where the R radicals, generally independently of one another, are the same or different and are a hydrogen atom or a nonreactive organic linear, branched, cyclic, aromatic or heteroaromatic radical, preferably $C_1$–$C_{18}$-alkyl or $C_6$–$C_{14}$-aryl, especially preferably $C_1$–$C_6$-alkyl, cyclohexyl or phenyl, and particularly methyl or ethyl. Especially advantageous for permanent hydrophobization of the aerogel is the use of trimethylsilyl groups. The incorporation of these groups can take place as described e.g. in WO 94/25149 or German patent application 196 48 798.6, or be carried out by gas-phase reaction between the aerogel and e.g. an activated trialkylsilane derivative, such as a chlorotrialkylsilane or a hexaalkyldisilazane (cf. R. Iler, The Chemistry of Silica, Wiley & Sons, 1979). Compared with OH groups the hydrophobic surface groups prepared in this manner extensively reduce the dielectric loss factor and dielectric constant.

Depending on the air humidity, aerogel particles having hydrophilic surface groups can adsorb water, as a result of which the dielectric constant and dielectric loss factor can vary with air humidity. This is often undesirable for electronic applications. The use of aerogel particles having hydrophobic surface groups reduces this variation, since no water is adsorbed. The selection of radicals is guided, in addition, by the typical temperature of use.

Furthermore, the thermal conductivity of the aerogel decreases with increasing porosity and decreasing density. For this reason aerogels having porosities above 60% and densities below 0.6 g/cm$^3$ are preferred. Particularly preferred are aerosols having densities below 0.2 g/cm$^3$.

In a preferred embodiment the aerogel particles are used in the form of a composite material, where, in principle, all aerogel-containing composite materials known in the prior art are suitable.

Especially preferred is a composite material containing 5 to 97% by volume of aerogel particles and at least one binding agent.

The binding agent forms a matrix which binds or encloses the aerogel particles and extends as a continuous phase through the entire composite material.

At an aerogel particle content that is significantly below 5% by volume of the composition, the positive properties of the composition would be largely lost due to the low proportion of the aerogel particles in the composition. Such a composition would no longer show the good impact and/or structure borne sound-attenuating characteristics.

An aerogel particle content significantly over 97% by volume would lead to a binder content of less than 3% by volume. In that case its proportion would be too low to ensure adequate binding of the aerogel particles to one another and to guarantee mechanical compressive and flexural strength.

The content of the aerogel particles is preferably in the range of 10 to 97% by volume and particularly preferably in the range of 40 to 95% by volume.

An especially high content of aerogel particles can be achieved in the composite material by using a suitable particle-size distribution. An example of this is the use of aerogel particles which have a normal logarithmic particle-size distribution.

To attain the highest possible degree of filling it is also favorable if the aerogel particles are small relative to the total thickness of the shaped part. Furthermore, large aerogel particles are sensitive to mechanical damage. Hence the size of the aerogel particles is preferably in the range of 50 μm to 10 mm, and especially preferably in the range of 200 μm to 5 mm.

In principle, all known organic and inorganic binding agents are suitable for the preparation of the composite materials. Here it is not of decisive importance whether the binding agent is amorphous, semicrystalline and/or crystalline. The binding agent is incorporated either in liquid form, i.e. used as a liquid, melt, solution, dispersion or suspension, or as a solid powder.

It is also possible to use both physically and chemically hardening one-component systems as well as two- or more-component systems or mixtures of same. The binder can also be in foamed form.

Examples of binding agents that can be used as liquid, melt, solution, dispersion, suspension or solid powder are acrylates, aluminum phosphates, cyanoacrylates, cycloolefin copolymers, epoxide resins, ethylene vinyl acetate copolymers, formaldehyde condensates, urea resins, melamine-formaldehyde resins, methacrylates, phenol resins, polyamides, polybenzimidazoles, polyethylene terephthalates, polyethylene waxes, polyimides, polystyrenes, polyurethanes, polyvinyl acetates, polyvinyl alcohols, polyvinyl butyrates, resorcinol resins, silicones and silicone resins.

The binding agent is generally used in an amount of 3 to 95% by volume of the composite material, preferably in an amount of 3 to 90% by volume, and especially preferably in an amount of 5 to 60% by volume. The choice of binding agent is based on the desired mechanical and thermal properties of the composite material.

In choosing the binding agents an additional consideration is to preferably choose products which do not significantly penetrate into the interior of the porous aerogel particles. The penetration of the binding agent into the interior of the aerogel particles can be affected not only by the choice of the binding agent, but also by different parameters, such as pressure, temperature and processing time.

Moreover the composite material can also contain up to 85% fillers. To improve the mechanical properties one can also add, in particular, fibers, fleece, fabrics, felts, as well as remainders or wastes of same. To this end film scraps and/or film remainders may also be used.

Beyond that, the composite material may contain additional fillers, e.g. for imparting color, for achieving special decorative effects, or for adjusting the adhesion of glues to the surface.

The proportion of fillers, calculated on the composite material, is preferably below 70% and especially preferably in the range of 0 to 50% by volume.

If aerogel particles having hydrophobic surface groups are used in combination with hydrophobic binders, a hydrophobic composite material is obtained.

Should the composite material be hydrophilic because of the binding agent used and/or because of hydrophilic aerogel particles, a subsequent treatment can optionally be carried out, which imparts hydrophobic characteristics to the composite material. Suitable for this purpose are all substances for this purpose known to persons skilled in the art, which impart a hydrophobic surface to the composite material, such as e.g. lacquers, films, silylating agents, silicone resins as well as inorganic and/or organic binding agents.

Moreover, in the course of gluing, so-called "coupling agents" can also be used. They effect a better contact of the binder with the surface of the aerogel particles, and beyond that, can assure a firm binding with both the aerogel particles and with the binding agent or with any fillers used.

The shaped articles prepared from aerogel granulate according to the invention have preferably a density of less than 0.6 g/cm$^3$, and preferably produce an improvement of the structure-borne or impact sound attenuation of more than 12 dB. Especially preferred is an improvement of the structure-borne or impact sound attenuation of over 14 dB.

The fire classification of the composite material is determined by the fire risk classification of the aerogel and the binding agents. To obtain an as favorable fire-risk classification of the composite material as possible (low-flammable or nonflammable) the composite material may additionally be coated with suitable materials, such as e.g. silicone resin glues. Moreover, the use of fire-protection agents known to persons skilled in the art is possible. Beyond that, all coatings known by persons skilled in the art which are e.g. dirt-repelling and/or hydrophobic can possibly be used.

The aerogel-containing composite materials can be prepared by mixing the aerogel and binding agent, bringing the mix into the desired shape and hardening.

In the preparation of the composite materials the aerogel particles are bound to each other by at least one binding agent. The binding of the individual particles to one another can also take place also in a punctiform manner. Such a surface coating can be achieved e.g. by spraying the aerogel particles with the binding agent (e.g. as solution, melt, suspension or dispersion). The coated particles are then e.g. pressed into a shaped article and hardened.

In a preferred embodiment the edge volume between the individual particles are fully or partially filled out by the binding agent. Such a composition can be prepared, for example, by mixing the aerogel particles with a powdered binding agent, bringing into the desired shape, and hardening.

The mixing in this case can be done in any conceivable manner. Thus it is possible, on the one hand, to simultaneously introduce at least two components into the mixing device, and on the other hand to first put in one component and then add the other(s).

Nor is the mixing device required for the mixing process limited in any way. For this purpose any mixing device known to persons skilled in the art can be used. The mixing process is carried out until obtaining an approximately uniform distribution of the aerosol particles in the composition. The mixing process can be controlled through its duration and also, e.g. through the speed of the mixing device.

This is followed by shaping and hardening of the mixture, which, depending on the nature of the binding agent, is done by heating and/or evaporating the solvent and/or dispersing agents used, or, in the case where melts are used, by cooling below the melting temperature of the binding agents or by chemical reaction of the binding agent or binding agents.

In a preferred embodiment, the mixture is compressed. In so doing, a person skilled in the art is able to select the press and pressing tool suitable for the use in question. Because of the large proportion of air of the aerogel-containing molded articles, the use of vacuum presses, for example press dies, is of advantage. To prevent adhesion of the aerogel-containing mixture to the pressing tool, for example press die, the aerogel-containing mixture to be pressed can be separated from the pressing tool with separating paper or separating foil. The mechanical strength of the aerogel-containing plates can be improved by laminating the plate surface with fabrics, foils, hard films or hard fiber plates. The fabrics, foils, hard films or hard fiber plates can be applied to the aerogel-containing plates during or after the preparation of the composite material. Application during the preparation is preferred and can preferably be carried out in one operating step by placing the fabrics, foils, hard films or hard fiber fabrics into the mold and putting them on top of the aerogel-containing mass to be pressed and then pressing under pressure and temperature to an aerogel-containing composite plate.

Depending on the binder used, the pressing generally takes place in any desired mold at pressing pressures of 1 to 1000 bar. For hardening, the mixture may be brought during the pressing process to temperatures of 0° C. to 300° C. However, it is also possible to press the mixture at temperatures that are significantly below those used for hardening, and subsequently harden them without the exertion of pressure.

In the case of composite materials which contain an especially large volume-% of aerogel particles and whose thermal conductivity is poor, heat can be introduced into the plates by means of additional and suitable radiation sources. If, as in the case of polyvinyl butyrals, the binding agent is coupled with microwaves, this radiation source is preferred.

The invention is described in greater detail by the following embodiments, without limiting its scope thereto.

The aerogels were prepared analogously to the process disclosed in DE-A-43 42 548.

The thermal conductivities of the aerogel granulates were determined by a hot wire method [see e.g. O. Nielsen, G. R üschenpöhler, J. Groβ, and J. Fricke: High Temperatures—High Pressures, Vol. 21, 267–274 (1989)]. The thermal conductivities of the molded articles were measured according to DIN 52612. As a measure of the improvement of the structure-borne or impact sound attenuation the extent of improvement of the impact sound was determined according to DIN 52210.

EXAMPLES

Example 1

Molded Article From 50% by Volume of Aerogel and 50% by Volume of Polyvinyl Butyral 50% by volume of hydrophobic aerogel granulate (solids density 130 kg/m$^3$) and 50% by volume of a polyvinyl butyral powder (solids density 1100 kg/m$^3$) are intimately mixed. Here, the volume percentage refers to the target volume of the molded article, the hydrophobic aerogel granulate has a particle size of more than 650 $\mu$m, a BET surface of 640 m$^2$/g and a thermal conductivity of 11 mW/mK. Used as polyvinyl butyral powder is Mowital® (Polymer F) (Hoechst AG) having a particle size around 50 $\mu$m.

The bottom of the mold is lined with separating paper. The aerogel-containing molding preparation is uniformly distributed thereon and the whole is covered with separating paper. The pressing is done at 220° C. for 30 minutes to a thickness of 18 mm.

The molded article obtained has a density of 280 kg/m$^3$ and a thermal conductivity of 40 mW/mK. The extent of impact sound improvement 19 dB.

Example 2

Molded Article From 80% by Volume of Aerogel and 18% by Volume of Polyvinyl Butyral and 2% by Volume of Polyethylene Terephthalate Fibers 80% by volume of hydrophobic aerogel granulate (solids density 130 kg/$m^3$), 18% by volume of a polyvinyl butyral powder (solids density 1100 kg/$m^3$) and 2% by volume of polyethylene terephthalate fibers are intimately mixed. The volume-% refers to the target volume of the molded article. The hydrophobic aerogel granulate has a particle size of more than 650 $\mu$m, a BET surface of 640 $m^2$/g and a thermal conductivity of 11 mW/mK. Used as polyvinyl butyral powder is Mowital® (Polymer F) (Hoechst AG) having a particle size around 50 $\mu$m. Used as fiber material are Trevira® High-Strength Fibers (Hoechst AG).

The bottom of the pressing mold is lined with separating paper. The aerogel-containing molding preparation is then uniformly distributed thereon and the whole is covered with separating paper. The pressing is done at 220° for 30 minutes to a thickness of 18 $\mu$m.

The resulting molded article has a density of 250 kg/$M^3$ and a thermal conductivity of 25 mW/mK. The extent of impact sound improvement is 22 dB.

Example 3

Molded Article From 90% by Volume of Aerogel and 10% by Volume of Pispersion Glue 90% by volume of hydrophobic aerogel granulate (solids density 130 kg/$m^3$ is sprayed in a mixer with 10% by volume of Mowilith® dispersion VDM 1340. The volume % refers to the target volume of the dry molded article. The hydrophobic aerogel granulate has a particle size of greater than 650 $\mu$m, a BET surface of 640 $m^2$/g and a thermal conductivity of 11 mW/mK. Used as dispersion adhesive is Mowilith® dispersion VDM 1340 (Hoechst AG).

The bottom of the pressing mold is lined with separating paper. The aerogel-containing molding preparation is uniformly distributed thereon and the whole is covered with separating paper. The pressing is done at 190° C. for 15 minutes to a thickness of 18 mm.

The resulting molded article has a density of 200 kg/$m^3$ and a thermal conductivity of 29 mW/mK. The extent of impact sound improvement is 24 dB.

What is claimed is:

1. A method for deadening impact sound emitted by or passed through a material which comprises applying to or filling said material with aerogel particles, wherein said aerogel particles have a size in the range of 50 $\mu$m to 10 mm.

2. The method according to claim 1, wherein the aerogel particles contain Si compounds.

3. The method according to claim 2, wherein the aerogel particles are $SiO_2$ aerogels.

4. The method according to claim 1, wherein the aerogel particles have permanent hydrophobic surface groups.

5. The method according to claim 1, wherein the aerogel particles have porosities of over 60% and densities below 0.6 g/$cm^3$.

6. The method according to claim 1, wherein the aerogel particles are in the form of a composite material.

7. The method according to claim 6, wherein the aerogel particles in the composite material are in the range of 5 to 97% by volume.

* * * * *